US008136146B2

(12) United States Patent
Hahn et al.

(10) Patent No.: US 8,136,146 B2
(45) Date of Patent: Mar. 13, 2012

(54) SECURE AUDIT LOG ACCESS FOR FEDERATION COMPLIANCE

(75) Inventors: Timothy James Hahn, Cary, NC (US); Heather Maria Hinton, Austin, TX (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 11/619,728

(22) Filed: Jan. 4, 2007

(65) Prior Publication Data

US 2008/0168567 A1   Jul. 10, 2008

(51) Int. Cl.
 *H04L 29/06* (2006.01)
(52) U.S. Cl. .......................................................... 726/4
(58) Field of Classification Search ........................ None
 See application file for complete search history.

(56) References Cited

U.S. PATENT DOCUMENTS

| 5,742,823 | A | 4/1998 | Edwards et al. | |
| 7,146,350 | B2* | 12/2006 | Holland et al. | 706/47 |
| 7,228,304 | B1* | 6/2007 | Wong et al. | 707/10 |
| 7,580,919 | B1* | 8/2009 | Hannel et al. | 707/3 |
| 2005/0010820 | A1 | 1/2005 | Jacobson | |
| 2005/0060572 | A1 | 3/2005 | Kung et al. | |
| 2005/0066021 | A1 | 3/2005 | Megley | |
| 2005/0091537 | A1 | 4/2005 | Nisbet et al. | |
| 2006/0242688 | A1* | 10/2006 | Paramasivam et al. | 726/5 |
| 2007/0261099 | A1* | 11/2007 | Broussard et al. | 726/1 |

\* cited by examiner

*Primary Examiner* — Brandon Hoffman
(74) *Attorney, Agent, or Firm* — Yee & Associates, P.C.; Jeffrey S. LaBaw (57) ABSTRACT

A computer implemented method, data processing system, and computer program product for allowing limited access to a federation partner's audit logs in a secure, controlled manner, for the purposes of compliance demonstration. A request for audit data is received by a partner in the federated environment. The partner validates the request and requests a local report using local parameters against a local audit log store. The partner then builds a response based on the local report.

20 Claims, 4 Drawing Sheets

SECURE AUDIT LOG ACCESS FOR FEDERATION COMPLIANCE

BACKGROUND OF THE INVENTION

1. Field of the Invention

The present invention relates generally to an improved data processing system, and in particular, to providing appropriate access in a federated computing environment to those audit logs required for fulfilling federated audit functionality in a secure, controlled manner for purposes of compliance demonstration.

2. Description of the Related Art

In today's computing environment, complex network data processing systems often are needed to facilitate work in large corporations. These complex networks may even span across regions in various worldwide locations, as well as use the Internet as part of a virtual private network for conducting business. In many instances, a federated data model is employed to allow Enterprise components to share and access information and resources throughout the network. With the federated data model, wherein multiple data sources appear as one to users, data resides and is controlled locally, and client users in the system may access the data using a directory service or links to other federated partners, regardless of the users' locations.

Within a federated environment, a single sign-on (SSO) environment is used to allow users to access third party Web sites without further authentication, as the third party Web site accepts the proof of authentications of the users presented to the third party Web site by the first Web site the users visit (and to which the user authenticated). For example, when a company employee logins to a corporate portal, an authentication interaction is initiated between the user and the corporate portal. When the user clicks on special links within this portal (for another partner's enterprise acting as third party resources to the company), a single sign-on action is initiated and the user is then single-signed on to the other partner enterprises. These other enterprises may include such third party resources such as the health care provider or 401k provider for the company's employees, but may also include other third party resources, such as supply chain management resources at a manufacturing partner. Thus, the corporate portal may include links to resources not only within the company itself, but it may also include links to other resources hosted by third parties. In an automotive industry for example, a user may be single-signed on from a supplier to the auto manufacturer, wherein the user may perform supply chain management, check inventory, check engineering design documentation, etc. In this manner, a user may perform business-related or access control-related tasks in a third party's environment based on the authentication of the user at the first entity (the identity provider).

Compliance is the ability to determine, in near real-time or after-the-fact, what events have occurred in a system, and more specifically, that the events that have been allowed to take place are consistent with an overall policy guiding allowable actions within and by the system. To check compliance of a system, audit logs are typically used to determine who has done what and when, within a system. For example, audit logs record who has accessed a resource and at what time from a security point of view. For example, when a user signs onto a workplace portal or desktop in the morning, a compliance system may be used to build a path which tracks the actions of the user and all of the applications that the user accesses in the system. Reports may also be generated on a per user basis which show what a particular user did and when the user did it. Rules may also be applied to the reports to identify if the accesses by the user are actually authorized by the system. Thus, compliance may be used to validate the system configurations in place which define what a user may access. In other words, compliance ensures that the system configurations are implemented correctly.

While compliance may be seen to ensure the ability to ensure that a security policy is enforced, compliance may also be applied to other types of policy, such as service level agreements (e.g., using timestamps on audit logs to ensure that an overall Service Level Agreement (SLA) is satisfied), legislative compliance (e.g., on control or release of privacy-related information), or even policy management itself (e.g., who changed a policy, when and how, and was it in compliance with the policy for compliance-policy-management).

Compliance is often demonstrated through audit log techniques. For example, when trying to determine if a user has correctly accessed a resource, audit logs are gathered from various components, such as from authentication services, session management services, authorization services, or applications. These audit logs are analyzed to determine if the actions are consistent with the policy governing allowable actions. This type of after-the-fact demonstration is a standard approach to demonstrating compliance and determining where compliance is broken. However, this existing approach is not sufficient in a federation environment, wherein users move from one security domain or Enterprise to another as part of their federation experience. In this situation, since the federation environment includes disparate security domains and disparate Enterprises, gaining access to the required audit logs of another federated partner is typically not possible since companies in a federated environment may not allow other companies to access their audit logs for various reasons. Thus, if an employee's company wants to build a report containing information regarding what resources the employee accessed in the federation environment, the company may only build a report for what the user did in the company's domain, since the logged actions of the user in the other federated partners' domains are not available to the company.

As an example of the need to build a complete, federated audit report, consider a federation participant acting in the role of a service provider. When a user single signs-on to the service provider, the identity provider typically includes information about the user's authentication methods as part of the single sign-on protocol (asserted within a single sign-on assertion). The service provider has no means of validating this as it does not have access to the identity provider's authentication service audit logs. In a federated audit environment, the service provider requires the ability to validate the assertions provided by the identity provider in the single sign-on assertion by validating the corresponding entries in the identity provider's authentication service audit logs. In other words, the service provider, in order to demonstrate compliance with the service provider's policies governing authentication and access, needs to consider the (relevant) information from its identity provider partner's audit logs.

SUMMARY OF THE INVENTION

The illustrative embodiments provide a computer implemented method, data processing system, and computer program product for allowing limited access to a federation partner's audit logs in a secure, controlled manner, for the purposes of compliance demonstration. A request for audit data is received by a partner in the federated environment. The partner validates the request and requests a local report using local parameters against a local audit log store. The partner then builds a response based on the local report.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
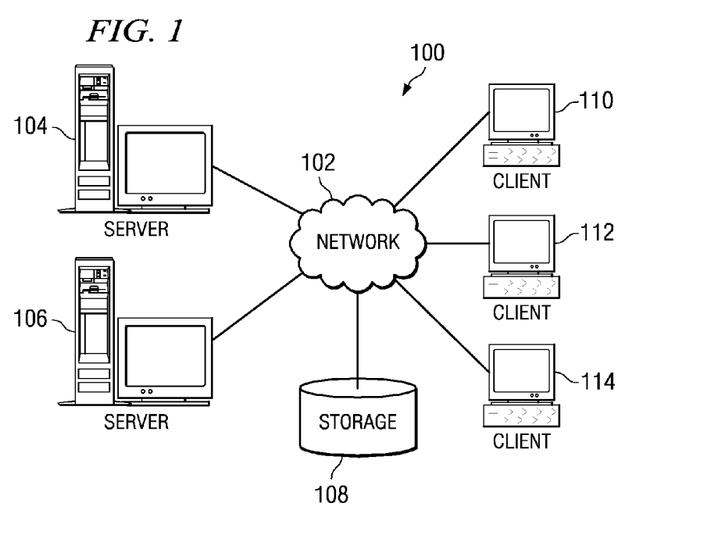
FIG. 1 depicts a pictorial representation of a distributed data processing system in which the illustrative embodiments may be implemented.
Figure 2:
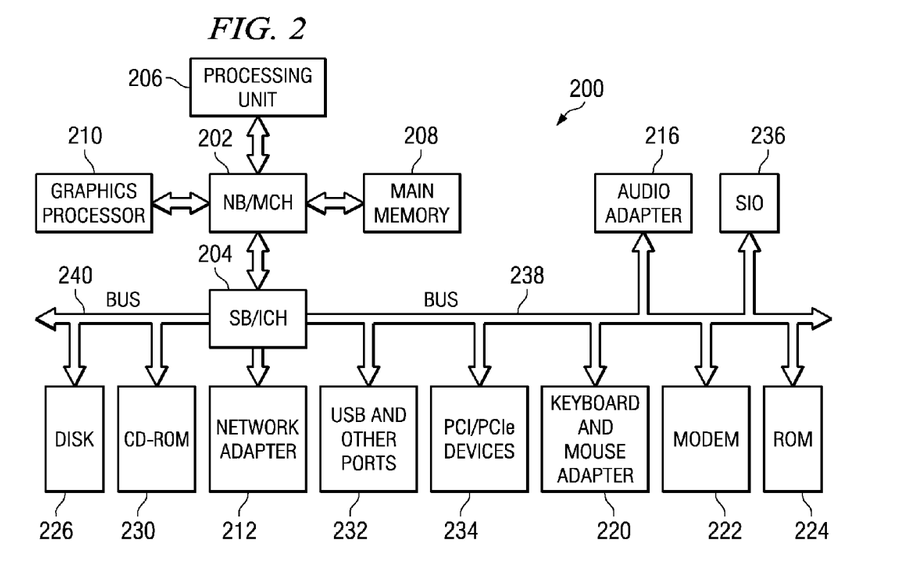
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in an Enterprise in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, data processing system, and computer program product for allowing limited access to a federation partner's audit logs in a secure, controlled manner, for the purposes of compliance demonstration in a federated computing environment. As previously mentioned, compliance of a system is typically demonstrated using audit logs which are reviewed to determine if policies, such as those governing client access to resources, are correctly implemented and enforced. However, since a federation computing environment comprises disparate security and trust domains, and possibly disparate Enterprises, a partner in such a federated environment cannot access the audit logs of other partners in other domains, but rather only has access to audit logs in the partner's own security domain. The illustrative embodiments provide a solution to the problem of obtaining audit log information across security domains by providing a mechanism in which a partner may request and obtain relevant audit log information located in multiple different security domains in the federation environment. The illustrative embodiments allow one federation partner (the requesting partner) to obtain all or part of another partner's (the responding or providing partner's) audit logs for the purposes of generating compliance reports (as well as investigating potential compliance breaches, intrusions, unauthorized activity, etc.) while not requiring that the partner actually expose their audit subsystem to the customer. The use of policy filters on a request will ensure that the audit information released to the requesting partner is in compliance with the responding partner's local policy (on audit log data release) while satisfying the requesting partner's request.

In particular, the illustrative embodiments allow a partner in the federated environment to obtain audit log information which the partner needs to perform compliance testing on a specific set of parameters. A partner may request or "pull" the audit log information from another security domain, or the audit log information may be sent or "pushed" to the partner by a providing partner. The "push" and "pull" natures of the audit log will allow for optimization, so that known required information is automatically pushed to a partner, and additional information can be requested, or pulled, as required.

For example, in a "pull" scenario, a company (acting as a requesting partner) may send a compliance request to the company's 401k provider (the responding or providing partner) to provide a snapshot of the 401k provider's audit log which meets specific requirements, such as all of the actions performed by users A, B, and C during the week, or the actions performed by user X over the past month, etc. The 401k provider has its own compliance system and the 401k provider gathers the requested information. The 401k provider filters through its own audit logs to build a snapshot of the gathered audit data. Further to this example, the 401k provider may provide the company with information on the number of federated actions per user, including the date and time of the single sign-on, but may not report on the actual actions, such as fund reallocations, made by each user. The audit data may be an extensible Markup Language (XML) representation of the data which is used as input to the requesting partner's audit reports. The 401k provider sends the snapshot back to the requesting partner. By allowing the 401k provider to build the report/compile the data and then provide the audit log information to the requesting company, the 401k provider is not required to allow the requesting partner into the 401k provider's security domain. Further, this approach does not require that the 401k provider expose all of the data in the 401k provider's local audit logs to the 401k provider's partners. Thus, the 401k provider may maintain complete control over the 401k provider's own audit logs. This control is especially important when dealing with regulations such as Securities and Exchange Commission (SEC) regulations, the Health Insurance Portability and Accountability Act of 1996 (HIPAA), or Health Level Seven (HL7) regulations, which govern how information held by a company may be released. A responding partner may tailor the audit log information it provides to a requesting partner in a manner that is consistent with these regulations. Likewise, the requesting partner may choose to structure the query at a high level so that the 401k provider only provides aggregate information relevant to all of the requesting partner's users and so that the 401k provider cannot determine if the requesting partner is seeking information on a subset of particular users or all users.

In a "push" scenario, a responding company, such as an automotive manufacturer, may provide periodic snapshots of the responding company's audit log which meet a set of criteria to the company's supplier partners. Thus, the "push" scenario is similar to the "pull" scenario, except that the nature of the required audit log information is known ahead of time and is generated and automatically provided to the requesting partner. Thus, the requesting partner does not have to (explicitly) request the audit log information each time it is required, as it will be automatically sent (pushed) to the requesting partner by the responding partner.

Figure 3:
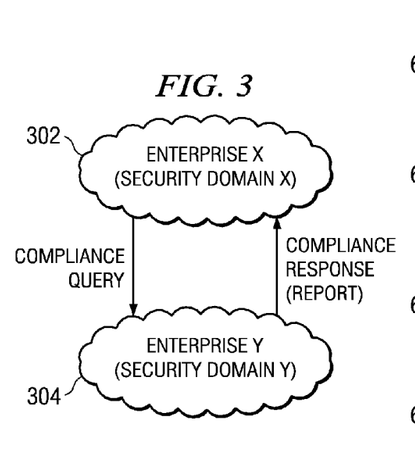
FIG. 3 is a high level diagram of a federated environment comprising disparate security domains in which exemplary aspects of the illustrative embodiments may be implemented.

FIG. 3 is a high level diagram of a federated data system comprising disparate security domains in which exemplary aspects of the illustrative embodiments may be implemented. In this illustrative example, only two partners are shown in the federated environment, although any number of enterprise systems may be included in the environment. Enterprise X 302 comprises security domain X, and Enterprise Y 304 comprises security domain Y. Since the federation environment comprises different security domains, Enterprise X 302 cannot access the audit logs of Enterprise Y 304, and vice versa. However, to determine if Enterprise X's 302 policies governing a user's access to resources were properly enforced in another security domain, Enterprise X 302 may require information that is recorded in the audit logs of Enterprise Y 304. In order to fulfill Enterprise X's 302 own audit report requirements, Enterprise X 302 may request the relevant audit log information from Enterprise Y 304. Upon obtaining the information from Enterprise Y's 304 own audit logs, Enterprise Y 304 sends the requested information back to Enterprise X 302. Enterprise X 302 may then evaluate the information to determine if the user's actions within Enterprise Y 304 are consistent with and in compliance with Enterprise X 302 policies, as well as the policies implemented and enforced by Enterprise Y 304, without Enterprise Y 304 having to allow Enterprise X 302 to access Enterprise Y's 304 audit logs.

Figure 4:
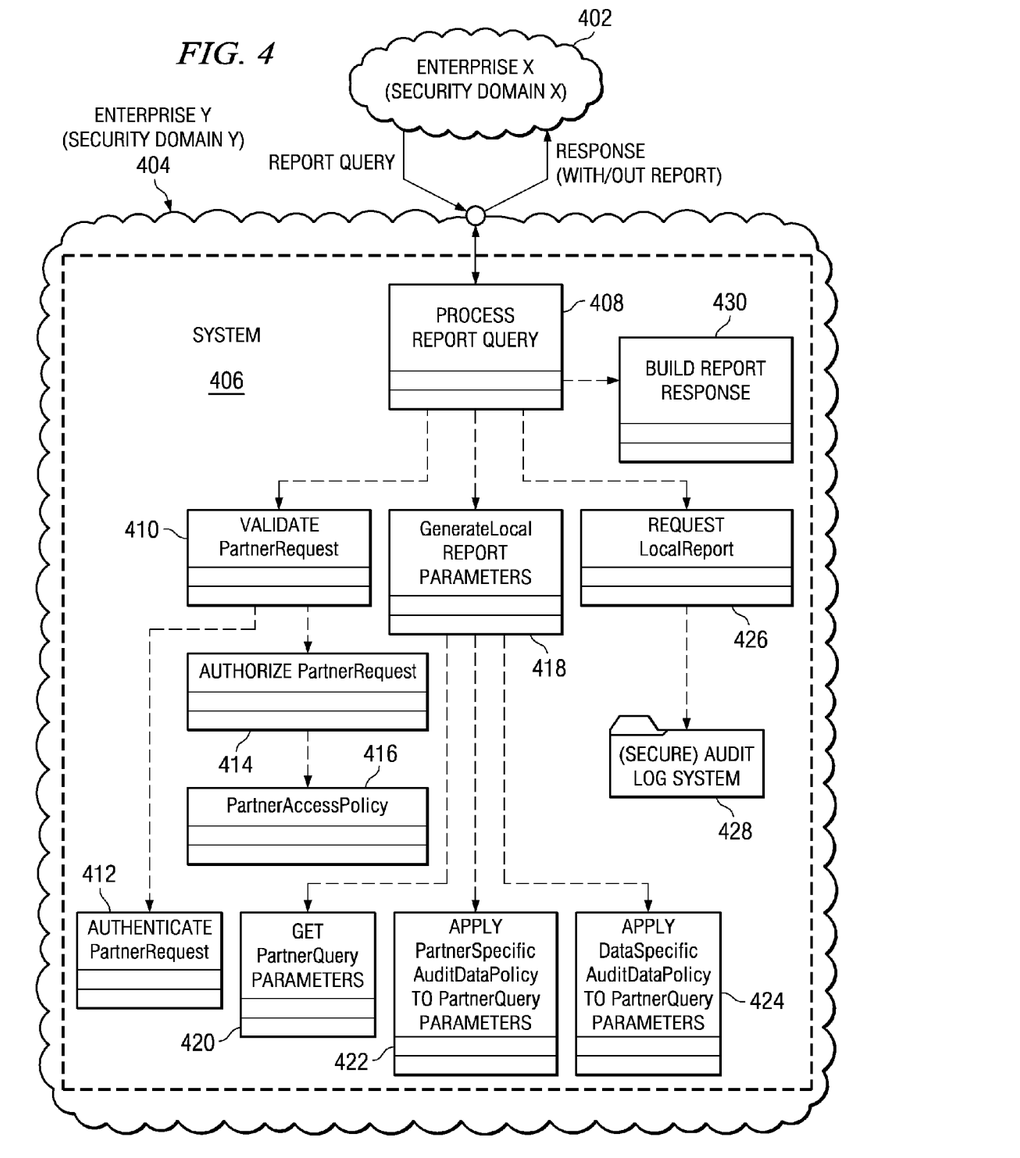
FIG. 4 is a diagram of a federated environment in which audit log information may be requested or "pulled" from a federated partner in accordance with the illustrative embodiments.

FIG. 4 is a diagram of a federated environment in which audit log information may be requested or "pulled" from a federated partner in accordance with the illustrative embodiments. In particular, FIG. 4 illustrates a compliance system implemented in a responding partner's environment within the federated environment, wherein the compliance system enables the responding partner to provide the responding partner's audit log information to other requesting partners in the environment. It should be noted that each partner in the federated environment may act both as a requesting partner and as a responding partner.

FIG. 4 illustrates a sample embodiment of how to implement the federated audit log compliance system in accordance with the illustrative embodiments, but others methods which achieve the same result of providing audit log information to requesting partners are also possible. In this illustrative example, the federated environment comprises Enterprise X 402 with security domain X, and Enterprise Y 404 with security domain Y. Enterprise Y 404 provides a suitable interface to Enterprise Y's 404 compliance system which is made available to Enterprise Y's partners for the purpose of generating the appropriate compliance reports, where the compliance report may be an explicit report that stands on its own (i.e., may be used by Enterprise X 402 in the form in which it is received), or the compliance report may be a set of audit log data that is to be used by Enterprise X 402 to generate Enterprise X's 402 own compliance report. This interface may be in a Web services format or a suitable application independent format (or even an application dependent format, but the interface may be less useful that way).

System 406 implemented at Enterprise Y 404 is responsible for processing compliance request queries from requesting partners in the federated environment. System 406 comprises various classes and relationships for processing the compliance query. For example, when a compliance request is received from Enterprise X 402, the initial request is processed (Process Report_Query 408). This request processing includes validating the request (Validate_Partner_Request 410). Validation typically comprises the authentication of the requesting partner and their request (Authenticate_Partner_Request 412) and authorizing the partner request (Authorize_Partner_Request 414). Note that authentication may require transport level authentication through techniques such as mutually authenticated Secure Socket Layer (SSL) and/or may include message layer techniques such as decrypting and validating signatures on a Web services request such as is implemented with WS-Security applied to a SOAP message. The authorization of the requesting partner's request (Authorize_Partner_Request 414) may be as simple as authorization based on successful authentication, or the authorization may include a more detailed authorization check against the responding partner's locally maintained (audit) access policy (Partner_Access_Policy 416) to determine whether the requesting partner is explicitly allowed to obtain audit information in general or the specific information requested. For instance, the authorization may include determining if Enterprise X 402 is allowed to request a compliance report, whether the partner is allowed to request that particular compliance report (e.g., whether the partner is allowed to request a report at the granularity of a specific user or if the partner is only allowed to request a report for all users, etc.), or whether additional parameters are satisfied, such as the requesting partner is not able to request audit reports between 6:00 pm Saturday and 9:00 am Sunday (e.g., Enterprise Y's 404 audit system is unavailable due to scheduled maintenance, such as audit log rollover, so that Enterprise Y 404 cannot guarantee the accuracy of the data that is generated for Enterprise X's 402 request). While it is possible that this level of authorization may include the authorization of the partner to request the particular audit information outside of the scope of a particular report, this authorization is typically not included at this point as the authorization will involve context-specific information that may not be available at this point in the processing.

Once the report query has been validated, system 406 may generate local compliance parameters corresponding to the request (Generate_Local_Report_Parameters 418) to determine if the request complies with the appropriate receiving partner and data policies. Local query parameter names may be obtained by extracting the appropriate query parameters from the requesting partner's request (so that Enterprise X 402 knows the parameter names at Enterprise Y 404), by mapping the requesting partner's requested parameters to locally valid parameter names (so that Enterprise Y 404 must map the parameter names asserted by Enterprise X 402 to locally valid parameter names), or by retrieving locally stored query parameters for that requesting partner (Get_Partner_Query_Parameters 420). For example, the query parameters may explicitly request that a compliance report be generated for all Enterprise X user access on November 12 between 8:50 am and 10:30 am, in which case the 420 functionality is responsible for translating the request, and request parameters, into a locally valid format. Alternatively, the request may simply specify that "audit report A" is requested, and so 420 is responsible for retrieving the local parameters that define this report. If audit report A has already been generated by Enterprise Y 404, the processing may immediately skip to 426 to retrieve the local report itself from the secure audit log system 428.

As a secure audit system, the Enterprise Y 404 application responsible for implementing process report query 408 may be required to authenticate (e.g. with mutually authenticated SSL) to the audit log system so that Enterprise Y 404 may record all access to the audit log system for both Enterprise Y's 404 and Enterprise X's 402 compliance purposes. Note that at this point, all that is happening is that system 406 is building a locally valid request to generate an audit report. A further validation of the requesting partner's query parameters may be performed by applying locally maintained partner specific audit data policy (Apply_Requesting_Partner_Specific_Audit_Data_Policy_To_Responding_Partner_Query_Parameters 422) to the query parameters. For example, the responding partner policy validation may determine that since "user Q" is not a requesting partner user, information about "user Q" cannot be queried. In another example, the responding partner policy validation may determine that since "user Q" is a requesting partner (where requesting partner is Enterprise X) user and also an Enterprise Z user, so only Enterprise X relevant activities may be reported on. In response to this determination, the requesting partner's query parameters may be further refined (e.g., by adding the query parameter RequestingPartner=Enterprise X to scope down the request to a subset of data) or expanded (e.g., by adding parameters to include information on actions that "user Q" has undertaken at Enterprise Z (not shown) based on SSO issued for "user Q" by Enterprise Y 404 in response to the user's F-SSO to Enterprise Y 404 from Enterprise X 402).

Further validation of the requesting partner's remaining query parameters may be performed by applying locally maintained responding partner data specific audit data policy (Apply_Data_Specific_Audit_Data_Policy_To_Partner_Query_Parameters 424) to the remaining parameters. The parameters which are not authorized by the policy are filtered out, thus further refining the parameters for the requesting partner's request. For example, the data policy validation may determine that any personally identifiable information about "user Q" which may be gathered from the audit logs based on the query parameters will not be included in the report. By applying the audit data policy, Enterprise Y 404 has the ability to ensure that Enterprise Y's 404 local regulations (SEC, HIPAA, etc.) will be satisfied despite the nature of the requests received from Enterprise X 402.

Based on the system's refinement of Enterprise X's 402 request, the system requests the appropriate audit report (Request_Local_Report 426) for the query using local parameters against the local (secure) audit log store(s) (Secure Audit Log System 428). A local audit log store may include the audit logs, an audit log system, or an audit log report system. The requested report may be a properly formatted report, or it may be a dump of all relevant audit logs into an additional file in some standard, normalized format, such as an XML formatted file. Using this information, the appropriate response is built (Build_Report_Response 430) and returned to Enterprise X 402. The response may be returned to the requesting partner in various ways, such as, for example, as an electronic mail message, an asynchronous Web service request, a paper electronic mail message, a Web service response that is returned after a suitable workflow process to validate the return of the report, or the like. Note that each of these steps in the fulfilling of Enterprise X's 402 report query may be audited by Enterprise Y 404, so that either entity may request or generate a compliance report that reports on the compliance report requests and their fulfillment.

The response may comprise a success compliance response if a report is generated, or a failure response if an error occurs during processing. A failure of the request may occur at any stage in the processing. For example, an "error status" may be reached when the system determines that a partner not authorized, the partner's query is not authorized, no valid query parameters left, etc. If an error is reached at any point in the processing, the process may typically skip straight to Build_Report_Response 430 with an (appropriate) error status. Note also that in order to disguise the fact that the report request failed, Enterprise Y 404 may generate a "null" report, to lessen the risk of a traffic analysis attack against Enterprise X 402 and Enterprise Y 404.

Figure 5:
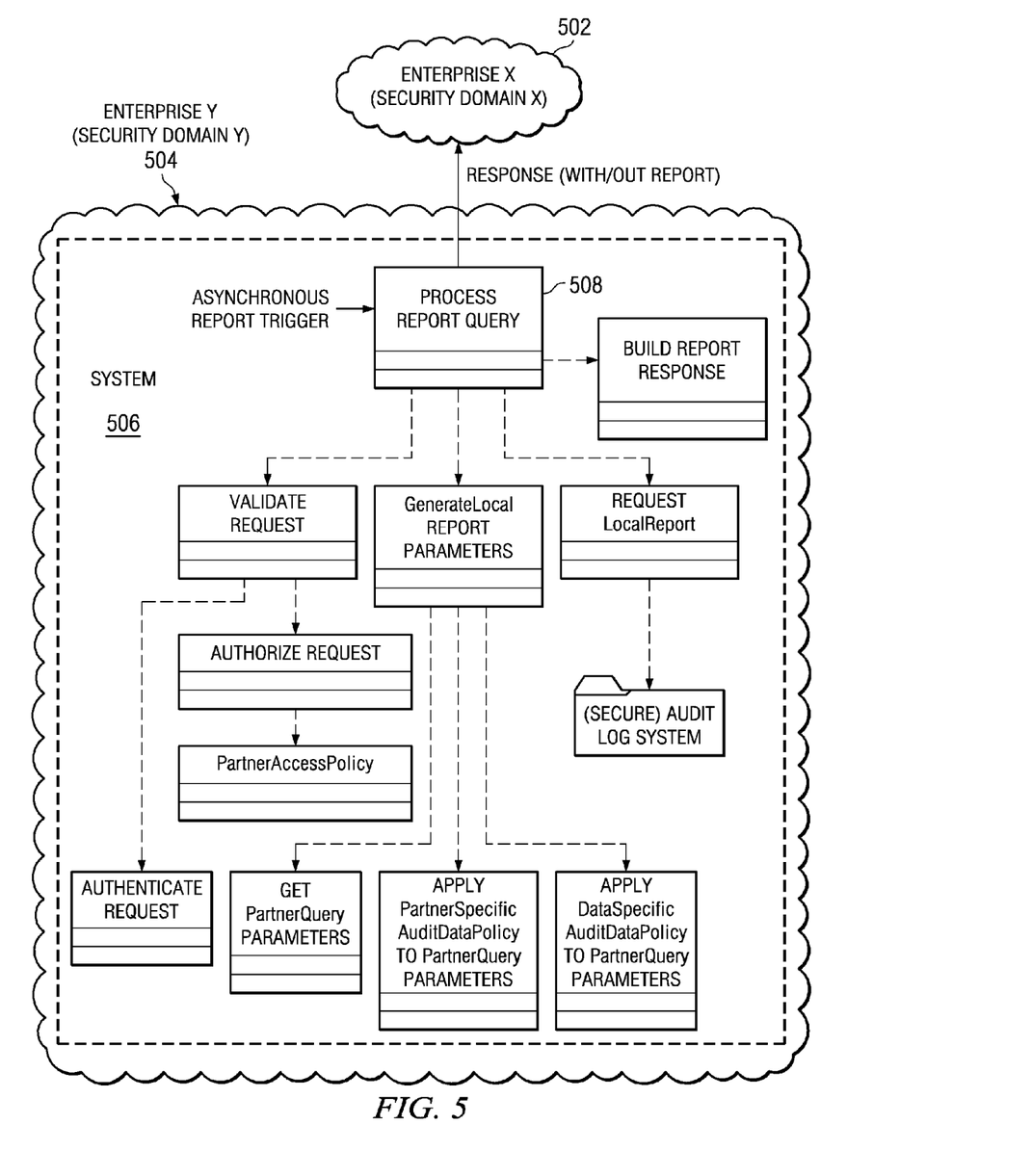
FIG. 5 is a diagram of a federated environment in which audit log information is provided or "pushed" to a federated partner in accordance with the illustrative embodiments.

FIG. 5 is a diagram of a federated environment in which audit log information is provided or "pushed" to a federated partner in accordance with the illustrative embodiments. The federated environment illustrated in FIG. 5 comprises Enterprise X 502 with security domain X, and Enterprise Y 504 with security domain Y. Like the "pull" scenario in FIG. 4, system 506 is implemented within Enterprise Y 504 and enables the partner to provide the partner's audit log information to other partners in the environment. However, in this example, Enterprise Y 504 sends or "pushes" known audit logs of interest to Enterprise X 502 automatically. Instead of being requested by the Enterprise X 502 partner, the report in a push model is generated in response to some sort of asynchronous report trigger. This trigger may be some sort of timed event, so that a report is generated for Enterprise X 502 every Saturday at 2:00 am, for example, or it may be generated by an application with Enterprise Y's 504 environment in response to an action by an Enterprise Y 504 user (e.g., administrator), perhaps in response to an out-of-band (e.g., telephone, email) request from an Enterprise X 502 administrator. Thus, while the request must still be validated (authenticated and authorized), this level of validation is typically centered on the ability of an Enterprise Y user to make such a request. System 506 applies the same data policies in FIG. 4 to the system's self-generated request and then sends the audit event to Enterprise X 502, including the auditing of the processing of the steps necessary to complete the report generation.

Although some of the steps present in FIG. 4 (e.g., 420, 422, 424) may be omitted in the process shown in FIG. 5 such that the asynchronous report may be assumed to have already been structured with the appropriate parameters, it should be noted that the process in FIG. 5 may include these steps as a means of providing the ability to update policies governing audit log release independent of the specified attributes used for the reports.

Figure 6:
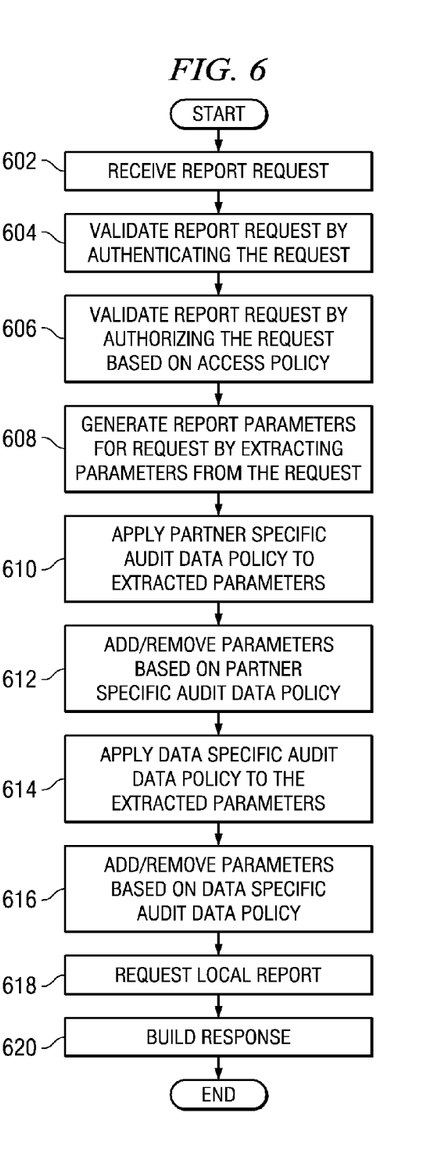
FIG. 6 is a flowchart of an exemplary process in a federated computing system for providing limited access to audit logs for purposes of compliance demonstration in accordance with the illustrative embodiments.

FIG. 6 is a flowchart illustrating an exemplary process of providing limited access to audit logs for purposes of report generation in accordance with the illustrative embodiments. The process begins when a partner receives a report request either from another partner in a federated computing environment or from a local application (step 602). In one example, a requesting partner in the federated environment may automatically generate a report request in response to predefined criteria, such as a periodic report generation. A report request may also be generated by the receiving partner in response to an out-of-band/indirect request by the requesting partner to an user at the receiving partner side (i.e. a user at the receiving partner side generates a report request in response to an action by a user at the requesting partner side).

A system at the receiving partner initiates processing of the request by first validating the request. The validation includes authenticating the request (step 604) to ensure that the request actually came from either the requesting partner or a valid local administrator, and authorizing the request (step 606) based on the receiving partner's (audit) access policy to ensure that the requesting partner is actually allowed to obtain the information in the request. Thus, even if a report is locally requested, it must satisfy the policy applied to the partner's audit reports (which may include policy explicitly allowing/denying the requesting of a report by (delegated) Enterprise Y user.

After the request has been validated, the request is refined by the receiving partner by generating local parameters for the request to ensure that the request complies with the appropriate receiving partner and data policies (as well as parameter names). Local parameters may first be generated by extracting parameters from the request and mapping the requested parameters to their local equivalent parameter names (step 608). Locally maintained partner specific audit data policy is then applied to the extracted parameters (step 610). Parameters may be removed from the request to filter out any audit information which the requesting partner may not have access, or added to the request to include any additional audit parameters which may be required to fulfill the request, based on the receiving partner's local data policy (step 612). Locally maintained data specific audit data policy is also applied to the extracted parameters (step 614). Parameters may be removed from the request to filter out any audit information not authorized by the local data policy, or added to the request to include any additional audit parameters which may be required to fulfill the request based on the local data policy (step 616). This filtered information will not be included in the report.

The system then requests a local report (step 618) using the local compliance parameters against the local audit log store. It should be noted that in an alternative embodiment, steps 610-616 which filter the request according the locally maintained policies may be performed after the local report is generated in step 618. The system may then build a response to be sent to the requesting partner (step 620).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing audit log information across different security domains in a federated environment, the computer implemented method comprising:
   receiving, at a first partner in the federated environment, a request for audit data from a second partner in the federated environment to form a received request, wherein the first partner is in a first security domain and the second partner is in a second security domain different from the first security domain;
   validating the received request to form a validated request;
   refining the validated request to comply with an audit data policy of the first partner;
   requesting a local report based on the refined validated request; and
   building a response based on the local report.

2. The computer implemented method of claim 1, further comprising:
   sending the response to the second partner in the federated environment.

3. The computer implemented method of claim 2, further comprising:
   the second partner combining the response with other audit data of the second partner to generate an audit report.

4. The computer implemented method of claim 2, wherein the response is sent to the second partner as an electronic mail message.

5. The computer implemented method of claim 1, wherein the refining step comprises:
   extracting query parameters from the validated request to form extracted query parameters; and
   generating local query parameters based on the extracted query parameters.

6. The computer implemented method of claim 5, wherein the refining step further comprises:
   filtering unauthorized query parameters in the validated request.

7. The computer implemented method of claim 6, wherein the audit data policy comprises at least one of a partner specific audit data policy and a data specific audit data policy, and wherein the filtering step further includes:
   applying the at least one of the partner specific audit data policy or the data specific audit data policy to the extracted query parameters in the request; and
   filtering audit information from the local report which is unauthorized by the partner specific audit data policy or the data specific audit data policy.

8. The computer implemented method of claim 7, wherein the partner specific audit data policy or the data specific audit data policy is maintained locally by the first partner, and wherein the partner specific audit data policy or data specific audit data policy maintained by the first partner overrides policies defined by the second partner.

9. The computer implemented method of claim 5, wherein the generating step includes translating the extracted query parameters into a locally valid parameter format of the first partner.

10. The computer implemented method of claim 1, wherein the validating step includes authenticating the request as a request for audit data.

11. The computer implemented method of claim 1, wherein the validating step includes authorizing the request or a requestor of the request based on an access policy of the first partner or the second partner.

12. The computer implemented method of claim 1, wherein the request is automatically generated by one of the second partner in response to a pre-defined criteria or the first partner in response to an out-of-band request or indirect request by the second partner.

13. The computer implemented method of claim 1, further comprising:
determining that the validated request does not comply with the audit data policy of the first partner, wherein the validated request is refined to comply with the audit data policy of the first partner responsive to determining that the validated request does not comply with the audit data policy of the first partner.

14. A data processing system for providing audit log information across different security domains in a federated environment, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to receive, at a first partner in the federated environment, a request for audit data from a second partner in the federated environment to form a received request, wherein the first partner is in a first security domain and the second partner is in a second security domain different from the first security domain, validate the received request to form a validated request, refine the validated request to comply with an audit data policy of the first partner, request a local report based on the refined validated request, and build a response based on the local report.

15. A computer program product for providing audit log information across different security domains in a federated environment, the computer program product comprising:
a non-transitory computer usable storage medium having computer usable program code stored thereon, the computer usable program code comprising:
computer usable program code for receiving, at a first partner in the federated environment, a request for audit data from a second partner in the federated environment to form a received request, wherein the first partner is in a first security domain and the second partner is in a second security domain different from the first security domain;
computer usable program code for validating the received request to form a validated request;
computer usable program code for refining the validated request to comply with an audit data policy of the first partner;
computer usable program code for requesting a local report based on the refined validated request; and
computer usable program code for building a response based on the local report.

16. The computer program product of claim 15, further comprising:
computer usable program code for determining that the validated request does not comply with the audit data policy of the first partner, wherein the validated request is refined to comply with the audit data policy of the first partner responsive to determining that the validated request does not comply with the audit data policy of the first partner.

17. The computer program product of claim 15, wherein the computer usable program code for refining the validated request to comply with the audit data policy of the first partner, comprises:
computer usable program code for extracting query parameters from the validated request to form extracted query parameters; and
computer usable program code for generating local query parameters based on the extracted query parameters.

18. The computer program product of claim 17, wherein the computer usable program code for refining the validated request to comply with the audit data policy of the first partner, further comprises:
computer usable program code for filtering unauthorized query parameters in the validated request.

19. The computer program product of claim 18, wherein the audit data policy comprises at least one of a partner specific audit data policy and a data specific audit data policy, and wherein the computer usable program code for filtering further includes:
computer usable program code for applying the at least one of the partner specific audit data policy or the data specific audit data policy to the extracted query parameters in the request; and
computer usable program code for filtering audit information from the local report which is unauthorized by the partner specific audit data policy or the data specific audit data policy.

20. The computer program product of claim 15, wherein the computer usable program code for validating comprises at least one of:
computer usable program code for authenticating the request as a request for audit data; and
computer usable program code for authorizing the request or a requestor of the request based on an access policy of the first partner or the second partner.

* * * * *